Aug. 22, 1950  J. T. GONDEK  2,520,004
SPRAG TYPE OVERRUNNING CLUTCH
Filed Dec. 23, 1946  3 Sheets-Sheet 1
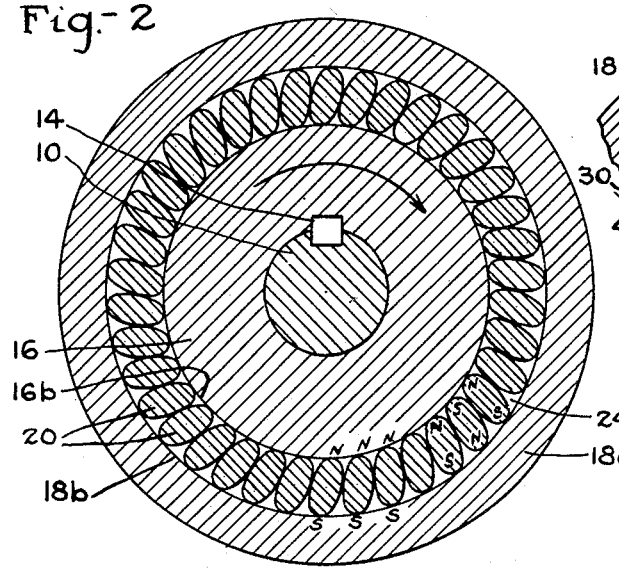
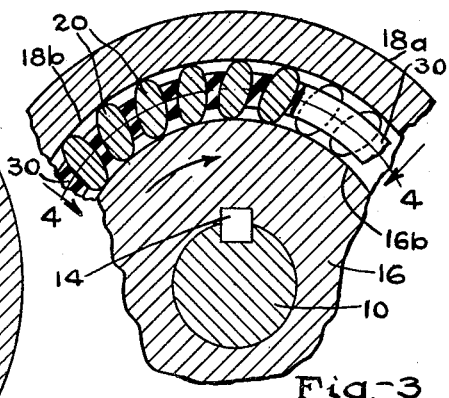
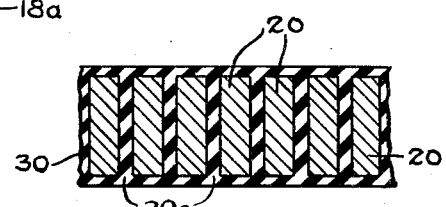
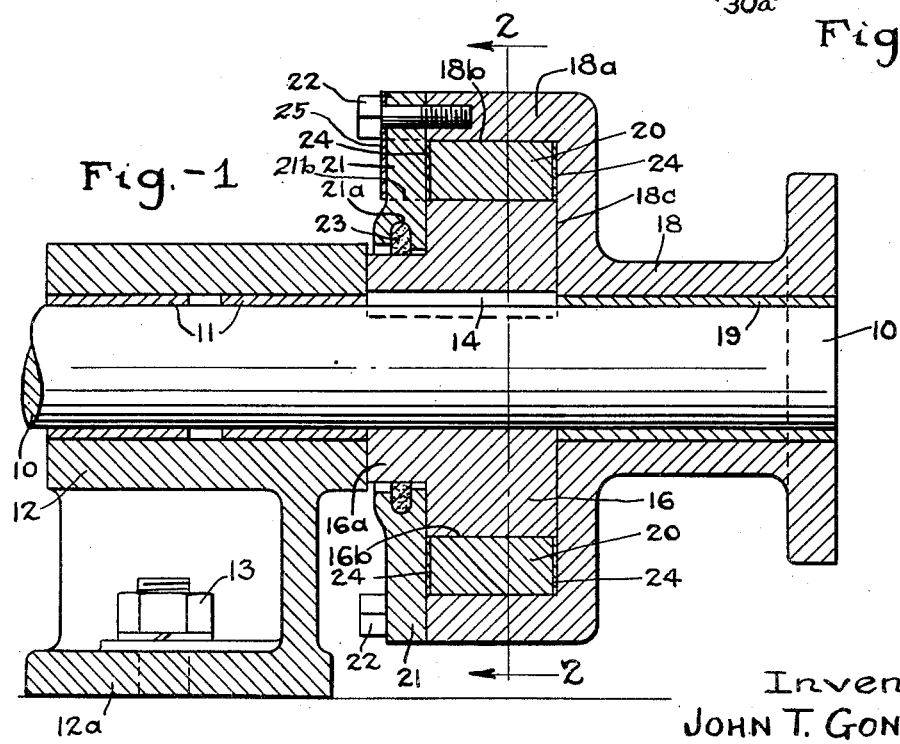
Inventor
JOHN T. GONDEK
By Chas. C. Reif
Attorney.

Aug. 22, 1950  J. T. GONDEK  2,520,004
SPRAG TYPE OVERRUNNING CLUTCH
Filed Dec. 23, 1946  3 Sheets-Sheet 2
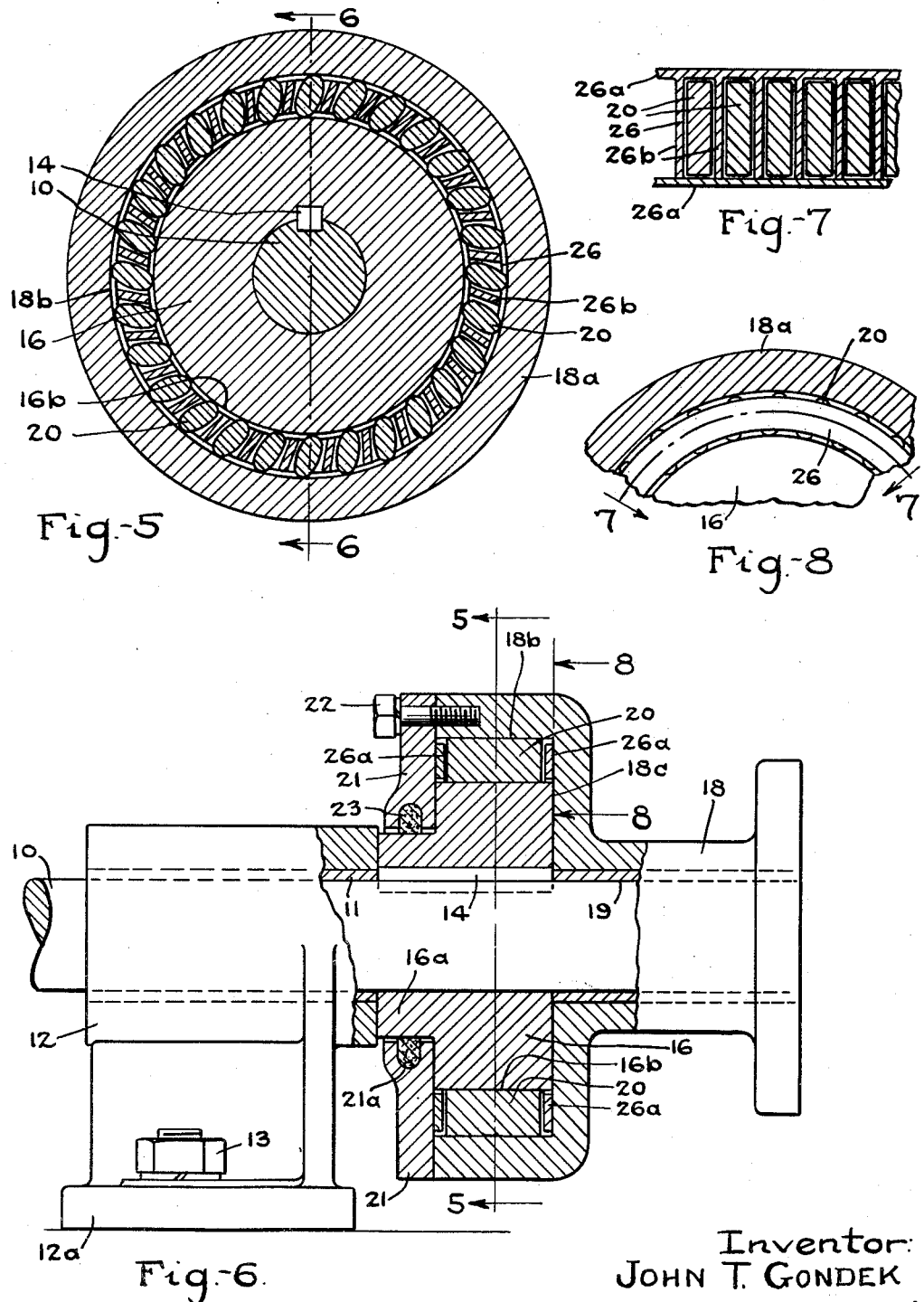
Inventor:
JOHN T. GONDEK
By Chas. C. Reif
Attorney Aug. 22, 1950 J. T. GONDEK 2,520,004
SPRAG TYPE OVERRUNNING CLUTCH
Filed Dec. 23, 1946 3 Sheets-Sheet 3

Inventor:
JOHN T. GONDEK
By Chas. C. Reif
Attorney

Patented Aug. 22, 1950

2,520,004

UNITED STATES PATENT OFFICE 2,520,004

SPRAG TYPE OVERRUNNING CLUTCH

John T. Gondek, Minneapolis, Minn., assignor, by mesne assignments, to Northern Ordnance, Incorporated, Fridley, Minn., a corporation of Minnesota Application December 23, 1946, Serial No. 717,884

7 Claims. (Cl. 192—45.1)

This invention relates to a clutch and particularly to a clutch of the overrunning type. Such clutches comprise two coaxial members with spaced surfaces and means disposed between these surfaces so that when one of said members is driven in one direction it will turn the other member but when driven in the opposite direction it will not turn the other member.

It is an object of this invention to provide a simple and efficient structure of overrunning clutch and one which is very compact so that it can be used where there is little space or room.

It is a further object of the invention to provide a structure of overrunning clutch comprising a member having a cylindrical periphery, a second member having a cylindrical surface spaced from said periphery, together with a series or multiplicity of comparatively small members disposed between said periphery and surface, said last mentioned members being of general oblong or elliptical shape in a cross section taken perpendicular to the axis of said first mentioned member, said last mentioned members preferably being magnetized with one pole adjacent said periphery and the other pole adjacent said cylindrical surface.

It is another object of the invention to provide such a structure as set forth in the preceding pararaph, together with simple and efficient means for supporting said last mentioned members and holding them in spaced relation.

It is also an object of the invention to provide a combined overrunning clutch and bearing.

These and other objects and advantages of the invention will be fully set forth in the following description made in connection with the accompanying drawings in which like reference characters refer to similar parts throughout the several views and in which:

Fig. 1 is a central longitudinal section through the device;

Fig. 2 is a vertical section taken on line 2—2 of Fig. 1, as indicated by the arrows;

Fig. 3 is a partial section similar to Fig. 2, showing a modification;

Fig. 4 is a section taken substantially on line 4—4 of Fig. 3, as indicated by the arrows;

Fig. 5 is a view similar to Fig. 2 showing a modification said view being taken along line 5—5 of Fig. 6;

Fig. 6 is a section taken on line 6—6 of Fig. 5, as indicated by the arrows, some parts being shown in side elevation;

Fig. 7 is a partial section taken on line 7—7 of Fig. 8;

Fig. 8 is a partial section taken on line 8—8 of Fig. 6;

Figure 9:
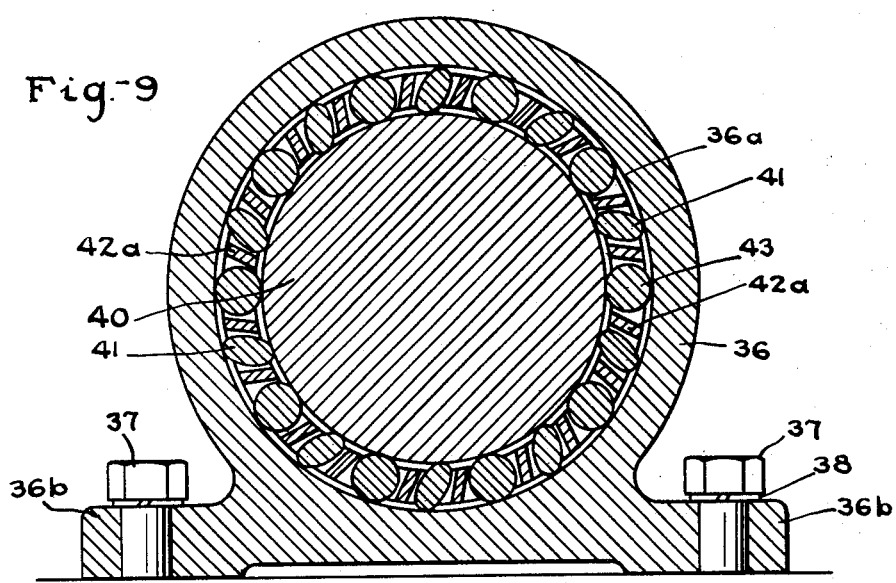
Fig. 9 is a central vertical section through a modified structure.

Referring to the drawings, a shaft 10 is shown which is carried in and journaled in a bushing 11 secured in the bore of a bearing 12 which can be secured to a suitable supporting member by bolts 13 extending through base flanges 12a thereof. Shaft 10 extends beyond bearing 12 and has secured thereto in any suitable manner, as by a key 14, a driving member 16. Member 16 has a hub 16a adjacent bearing 12 and is provided with a cylindrical periphery 16b. Shaft 10 projects beyond member 16 and has journaled thereon a member 18 provided with a bushing 19 which turns on shaft 10. Member 18 has an annular portion 18a surrounding periphery 16b and having a cylindrical wall 18b spaced from periphery 16b. Disposed between periphery 16b and surface 18b is a series or multiplicity of comparatively small members 20. While these members might be variously formed, they are preferably, and in the embodiment of the invention illustrated, made of general oblong or elliptical form in a cross section taken perpendicular to the axis of shaft 10 and thus of members 16 and 18. Members 18, 16 and 18, as described, are coaxial. As shown in Fig. 2, the members 20 have their smaller and rounded ends in substantial engagement with periphery 16b and surface 18b and each of said members is disposed with its longitudinal central axis at a slight angle to the radius drawn from the center of shaft 10 to its center. Also as shown in Fig. 2, members 20 are disposed close together so that they are in contact along their sides. Members 20 are preferably magnetized with one pole at the end adjacent periphery 16b and the other pole at the opposite end or the end adjacent surface 18b and thus constitute permanent magnets. The members 20 preferably have flat ends perpendicular to the axis of member 16 and member 18 has a flat surface 18c engaged by one end of member 16. An annular plate 21 is provided having substantially the same diameter as portion 18a and the same engages the flat end of member 18a and the end of member 16 beyond shoulder 16a. Plate 21 will be held in place by a plurality of circumferentially spaced screws 22 extending through the same and threaded into portion 18a. Plate 21 is shown as having an annular slot 21a in which an oil sealing washer 23 is disposed having its inner annular surface engaging hub 16a. Plate 21 also preferably has an aperture 21b therethrough which will be shaped in cross section similar to members 20, as shown in Fig. 2, and will be slightly larger than the cross section of a member 20. Preferably thin annular plates 24 are disposed at the ends of members 20 and will engage said ends as well as surface 18c and the inner surface of plate 21. These members 24 can be made of suitable metal, fiber or plastic. A plate 25 may be provided and held by one of the bolts 22, the same being disposed over aperture 21b and movable to uncover said aperture when said bolt 22 is loosened.

In operation members 16 and 18 will be brought into the relation shown in the drawings and the members 20 will be placed between said members with members 16 and 18 in position with their axis substantially vertical. The members 20 could be all placed in position before plate 21 is applied. If desired, plate 21 could be applied and then members 20 could be successively placed in position through aperture 21b which would then be uncovered by plate 25. With the structure assembled as shown it will be seen that when shaft 10 and member 16 are rotated in a counter-clockwise direction, as shown in Fig. 2, member 16 will run free and member 18 will not be driven. Members 20 will shift very slightly with their ends adjacent member 16 moving very slightly in the direction of movement of member 16. There will of course be abundant lubricant supplied between members 20, periphery 16b and surface 18b. When shaft 10 is driven in a clockwise direction, as shown in Fig. 2, as indicated by the arrow, then members 20 shift slightly in position and bind between members 16 and 18, so that member 18 is immediately driven through members 20. The gripping action of members 20 is instantaneous upon clockwise rotation of member 16 so that there is no looseness or backlash in the clutch. The members 20 being magnetized are attracted by the metal in members 16 and 18 and the magnetization causes members 20 to attempt to swing to radial position. The magnetization therefore holds members 20 in the position shown in Fig. 2 so that they do not move any appreciable distance in a clockwise direction about their central axes perpendicular to the plane of the drawing.

In Figs. 5 to 8 a modified form of the construction is shown in which members 20 are spaced some distance apart and the same are carried in a cage 26 having portions 26a disposed at the ends of members 20. Portions 26b extend from one portion 26a to the surface of the other portion 26a between the members 20. Members 20 will also preferably be magnetized in the structure shown in Fig. 5. The operation of the structure shown in Fig. 5 is the same as that already described and it is believed it will not be necessary to repeat the same.

Figure 11:
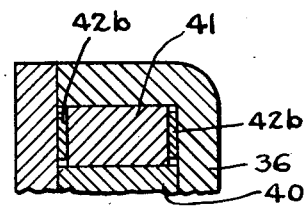
Fig. 11 is a section taken on line 11—11 of Fig. 10.

In Figs. 3, 4 and 11 a further modification is shown in which members 20 are imbedded in a ring 30 which will be made of resilient material, such as rubber or some rubber compound or similar material. Ring 30 has portions 30a extending along the ends of members 20. Members 20 preferably will be bonded to ring 30. In both the modifications shown in Fig. 5 and that shown in Figs. 3 and 4 the members 20 will have the same position relative to the axis of member 16, as shown in Fig. 2. With the structure shown in Fig. 4 the ring 30 will hold members 20 in the desired position and when they shift slightly in their gripping movement said ring will return the same to their normal position when the clutch releases.

Figure 10:
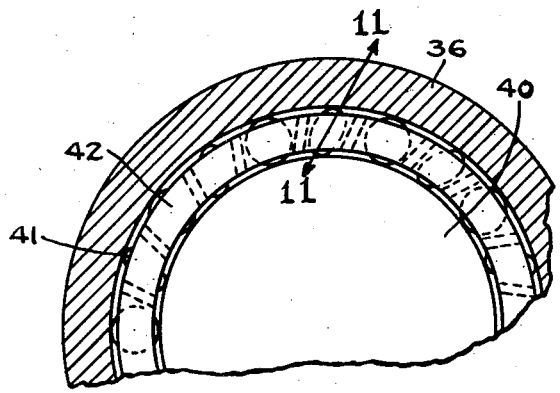
Fig. 10 is a view similar to Fig. 8 showing the modification of Fig. 9.
Figure 12:
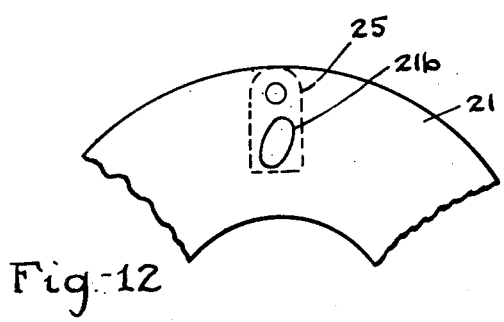
Fig. 12 is a partial view in end elevation as seen from the left of Fig. 1, plate 25 being shown in dotted lines.

In Figs. 9 to 11 a modified form of structure is shown which comprises both a bearing and a clutch. A member 36 is provided, the same being illustrated as a bearing housing having a cylindrical bore 36a therein and having flanges 36b at the sides thereof adapted to be connected to a suitable base or support by bolts 37 extending through said flanges. Spring locking washers 38 are shown under the heads of bolts 37. A second member or shaft 40 is provided and this has a cylindrical periphery spaced some distance from the wall of bore 36a. A plurality of members 41 are provided which are identical with the members 20 already described. These are disposed with their longitudinal central axes at a slight angle to the radius. Members 41 are circumferentially spaced and kept in proper relation by the transversely extending portions 42a of a cage 42 which is similar to cage 26 and has side members 42b of annular form disposed at the ends of members 41. Between adjacent members 41 bearing members 43 are disposed between shaft 40 and the wall of bore 36a and these will be in engagement with said shaft and wall. Bearings members 43 are also kept in position by cage 42. Bearing members 43 can be in the form either of rollers or balls. Members 41 will, like members 20, preferably be magnetized and the ends thereof adjacent shaft 40 and the wall of bore 36a will form the positive and negative poles of said magnet. Members 41 thus tend to move to radial position. In many installations it is desired to have a shaft which can only rotate in one direction.

With the structure described member 36 forms a bearing for shaft 40, which shaft rotates on the bearing members 43. The shaft 40 can rotate freely in a counter-clockwise direction, as seen in Fig. 9. Members 41 are merely moved slightly to a more angular position by the rotation of shaft 41 in such direction and offer no resistance to such rotation. However when shaft 41 is turned to move in a clockwise direction, as seen in Fig. 9, members 41 immediately bind between said shaft and the wall of bore 36a so that rotation of said shaft in a clockwise direction is positively prevented. The described structure thus forms a combined bearing and a one-way or overrunning clutch. If balls are used for bearing members 43 one or more of the same could be disposed between adjacent portions 42a longitudinally of shaft 40.

The relative size of members 20 and 41 has been somewhat exaggerated in the drawings for the purpose of clearness. In actual practice these members would be relatively smaller.

From the above description it will be seen that I have provided a very simple and yet highly efficient structure of overrunning clutch. The members 20 can be made quite small and can be inserted between rotating members in many structures where there would not be room for other forms of overrunning clutch structures. As stated, the magnetization of members 20 holds them efficiently in the desired position. The structure is quite simple and easily made and assembled. The same has been amply demonstrated in actual practice and found to be very successful and efficient.

It will of course be understood that various changes may be made in the form, details, arrangement and proportions of the parts, without departing from the scope of applicant's invention, which generally stated consists in a device capable of carrying out the objects above set forth, in the parts and combinations of parts disclosed and defined in the appended claims.

What is claimed is:

1. An overrunning clutch having in combination, a member having a cylindrical periphery, an annular member coaxial therewith and having a cylindrical surface spaced from said periphery, and a series of members disposed between said periphery and surface of substantially elliptical shape in a cross section taken perpendicular to the axis of said members and each having its longitudinal central axis at a small angle to the radius of said first mentioned member drawn to its center, and each of said last mentioned members being magnetized with one pole adjacent said periphery and the other pole adjacent said surface.

2. The structure set forth in claim 1, said last mentioned members having flat ends perpendicular to their longitudinal central axes respectively and thin annular rings at each of said ends.

3. The structure set forth in claim 1, a plate overlying one end of said series of members and having an aperture therein through which said members may be inserted.

4. An overrunning clutch having in combination, a member having a cylindrical periphery, a second member coaxial with said first mentioned member and having a cylindrical surface spaced from said periphery, a multiplicity of comparatively small members disposed between said periphery and surface, the same being of generally elliptical shape in a cross section taken perpendicular to the axis of said members, each of said last mentioned members having its longitudinal axis at a small angle to the radius of said first mentioned member drawn to its center, a cage having portions at the ends of said last mentioned members, said last mentioned members having means extending therefrom into said portions for supporting said last mentioned members and said last mentioned members being magnetized with one pole at the end adjacent said periphery and the other pole at the end adjacent said surface thus constituting permanent magnets.

5. An overrunning clutch having in combination, a member having a cylindrical periphery, an annular member coaxial therewith and having a cylindrical surface spaced from said periphery and a multiplicity of members disposed between said periphery and surface of oblong shape in a cross section taken perpendicular to the axis of said members and each having its longitudinal central axis at a small angle to the radius of said first mentioned member drawn to its center, each of said last mentioned members being magnetized with one pole adjacent said periphery and the other pole adjacent said surface, and means supporting said last mentioned members in spaced relation.

6. The structure set forth in claim 1, said series of members having their adjacent surfaces in contact.

7. An overrunning clutch having in combination, a member having a cylindrical periphery, an annular member coaxial therewith and having a cylindrical surface spaced from said periphery, and a series of members disposed between said periphery and surface of substantially elliptical shape in a cross section taken perpendicular to the axis of said members and each having its longitudinal central axis at a small angle to the radius of said first mentioned member drawn to its center, each of said last mentioned members constituting a permanent magnet with one pole adjacent said periphery and the other pole adjacent said surface, said members being held in position magnetically when said clutch is disengaged.

JOHN T. GONDEK.

REFERENCES CITED

The following references are of record in the file of this patent:

UNITED STATES PATENTS

| Number | Name | Date |
|---|---|---|
| 237,071 | Walter et al. | Jan. 25, 1881 |
| 283,759 | Daft | Aug. 28, 1883 |
| 1,640,871 | Ballard | Aug. 30, 1927 |
| 1,923,283 | Stokes | Aug. 22, 1933 |
| 1,952,461 | Roos | Mar. 27, 1934 |
| 2,035,925 | Seamark | Mar. 31, 1936 |
| 2,054,222 | Lapsley | Sept. 15, 1936 |
| 2,167,641 | Dewan | Aug. 1, 1939 |
| 2,217,048 | Floss | Oct. 8, 1940 |
| 2,300,223 | Hottenroth, Jr. | Oct. 27, 1942 |
| 2,366,843 | Dodge et al. | Jan. 9, 1945 |
| 2,370,800 | Kind et al. | Mar. 6, 1945 |
| 2,388,424 | Lund | Nov. 6, 1945 |
| 2,408,962 | Swenson et al. | Oct. 8, 1946 |
| 2,410,818 | Grant, Jr. | Nov. 12, 1946 |